F. RIEDINGER.
HORIZONTAL TELEMETER.
APPLICATION FILED FEB. 5, 1915.

1,414,790. Patented May 2, 1922.

Witnesses:

Inventor:
Franz Riedinger

UNITED STATES PATENT OFFICE.

FRANZ RIEDINGER, OF JENA, GERMANY, ASSIGNOR TO THE FIRM OF CARL ZEISS, OF JENA, GERMANY.

HORIZONTAL TELEMETER.

1,414,790. Specification of Letters Patent. Patented May 2, 1922.

Application filed February 5, 1915. Serial No. 6,312.

(GRANTED UNDER THE PROVISIONS OF THE ACT OF MARCH 3, 1921, 41 STAT. L., 1313.)

*To all whom it may concern:*

Be it known that I, FRANZ RIEDINGER, a citizen of the German Empire, residing at Jena, Germany, have invented a new and useful Horizontal Telemeter, of which the following is a specification.

The invention consists in an improvement in horizontal telemeters containing the base-line within the instrument in which, especially in those according to Patent 1,118,337, each of the two pencils of ray systems belonging to the ends of the base-line pierces a deflecting device of variable deflection, which permits of the image formed from the pencil system and presented to the observer, being displaced in the direction parallel to the base-line, both devices being coupled with one another in such a manner, that the two images for purposes of alteration of the direction of outlook, can be displaced in the direction of the base-line jointly by a small amount. In order to maintain the adjustment of such telemeter for all directions of outlook, the amount by which on actuating the deflecting devices the images will be displaced, must be absolutely the same. This however anticipates a precision of the single parts of the coupling and its gear with the telemeter, which is difficult to obtain in the actual manufacture and can scarcely be maintained in using the instruments.

In order to avoid these difficulties such telemeters according to the invention are provided with two locking devices separated from the gear of the deflecting devices, these locking devices being so developed that after a certain displacement of the images they always allow to compensate a deviation of the deflecting devices, due to mechanical imperfections, from the position they should have theoretically.

When a telemeter, in which in order to carry out the measurement, the image of an object must be brought to a definite place of the field of view, for instance aside the image of the corresponding parts of a stereoscopic range scale, is equipped according to the invention, it is necessary on account of the limitation in the choice of the directions of outlook, to journal the instrument so as to be rotatable in the plane of triangulation by a small amount unless it be preferred to provide the telemeter with a second pair of deflecting devices, which still allows within comparatively narrow limits a continual displacement of the images.

Figure 1:
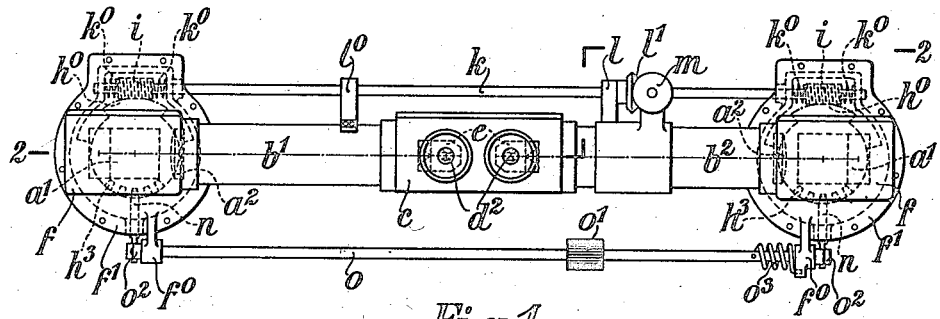
Figure 2:
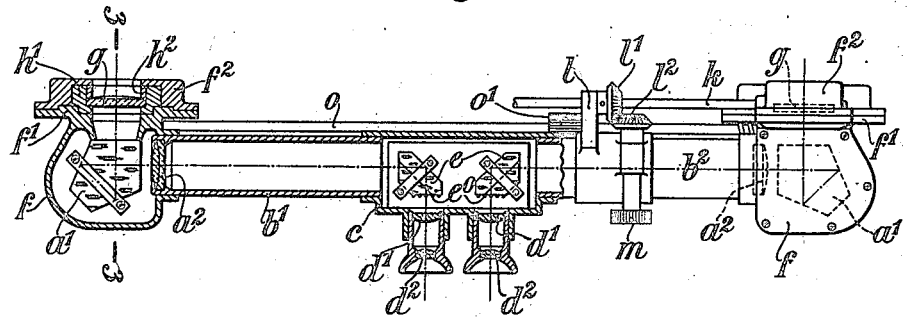
Figure 3:
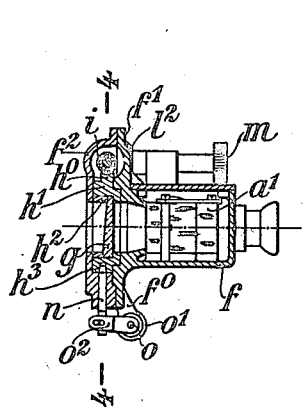
Figure 4:
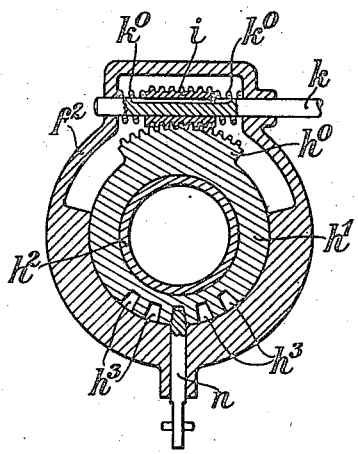

In the drawing a stereoscopic telemeter is shown as a constructional example. Fig. 1 is an elevation of the instrument from the back, Fig. 2 is a plan view, Fig. 3 is a section and Fig. 4 shows a detail of construction on a larger scale than the other figures.

The objective systems each consist of a pentagonal prism $a^1$ and an objective lens $a^2$. The two tubes $b^1$ and $b^2$, which each carry one of the objective lenses, are connected together by an intermediate body $c$, which receives the ocular system. In front of each of the two oculars $d^1$, $d^2$ a ridge prism $e$ is disposed, the surface of emergence of which lies in the focal plane of the corresponding ocular and carries a system of marks $e^0$. In each of the two objective prism casings $f$ there is journaled in a projecting part $f^1$ behind a lid $f^2$ a glass wedge $g$ with its mounting $h^1$, $h^2$ rotatably about the corresponding axis of entrance in such a manner that the plane of its principal section is parallel to the axis of entrance of the corresponding objective prism. The mountings are provided with two worm-wheel segments $h^0$ geared the same way, with each of which a worm $i$ journaled in the corresponding objective prism casing engages. A shaft $k$ serves for the joint rotation of the two glass wedges, which shaft is connected with both worms, is journaled on the instrument in a body $l$ and in a second body $l^0$ and may be rotated by means of bevel gearing $l^1$, $l^2$ with the aid of a milled head $m$. A bolt $n$ is guided to each of the lids $f^2$ which serves to block the rotation of its glass-wedge $g$. These two bolts can be jointly pushed by turning with the aid of a milled head $o^1$ a shaft $o$, journaled in tappets $f^0$ of each projecting part $f^1$ and carrying at its free ends each a lever $o^2$ coupled with its bifurcated end to the corresponding bolt $n$. The end of each bolt $n$ is conically formed and fits into grooves $h^3$ of the mounting $h^1$ of the glass wedge $g$ belonging to it. Each bolt $n$ engages with a groove after a certain rotation of the wedges $g$ by the effect of a spiral spring $o^3$. Any existing deviations of the two glass wedges $g$ from such a mutual position which would correspond to an equally displaced position of the images are compensated by an additional rotation of the wedges $g$; this additional rotation is possible as the driving worms $i$ on the shaft $k$ are displaceably journaled between spiral screws $k^o$.

I claim:

1. In a horizontal telemeter containing the base-line within the instrument a measuring device, an ocular system, an ocular reflecting system, at either side of the said ocular reflecting system, an objective lens and a deflecting device, the said deflecting devices being adapted to displace in the direction of the base-line the images formed from the ray pencil systems entering the instrument at either end of the base-line, actuating means for effecting a joint displacement of the two images in the same direction by a joint alteration of the setting of the said deflecting devices, means for yieldingly coupling the said actuating means and the said deflecting devices and two locking devices independent from the said actuating means, each locking device being adapted to cooperate with one of the said deflecting devices.

2. In a horizontal telemeter containing the base-line within the instrument a measuring device, an ocular system, an ocular reflecting system, at either side of the said ocular reflecting system an objective lens and a deflecting device, the said deflecting devices being adapted to displace in the direction of the base-line the images formed from the ray pencil systems entering the instrument at either end of the base-line, actuating means for effecting a joint displacement of the two images in the same direction by a joint alteration of the setting of the said deflecting devices, means for yieldingly coupling the said actuating means and the said deflecting devices and two locking devices independent from the said actuating means, each locking device being adapted to cooperate with one of the said deflecting devices and being so formed as to impart always after a certain displacement of the images a motion to the deflecting device pertaining to it independent of the motion that this deflecting device receives from the said actuating means.

FRANZ RIEDINGER.

In presence of—
PAUL KRUGER,
RICHARD HAHN.